(12) United States Patent
Kochi et al.

(10) Patent No.: US 7,015,967 B1
(45) Date of Patent: Mar. 21, 2006

(54) IMAGE FORMATION SYSTEM

(75) Inventors: Nobuo Kochi, Tokyo (JP); Hitoshi Otani, Tokyo (JP); Tadayuki Ito, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/564,990

(22) Filed: May 5, 2000

(30) Foreign Application Priority Data

May 10, 1999 (JP) .................................. 11-128910

(51) Int. Cl.
*H04N 5/222* (2006.01)
(52) U.S. Cl. ............ 348/333.02; 348/144; 348/207.99; 382/154; 701/207
(58) Field of Classification Search ........... 348/207.99, 348/114, 116, 117, 118, 333.02; 701/207, 701/208; 382/154
See application file for complete search history.

(56) References Cited

U.S. PATENT DOCUMENTS

| | | | | |
|---|---|---|---|---|
| 4,908,642 A | * | 3/1990 | Komatsuzaki et al. | 396/102 |
| 5,247,356 A | * | 9/1993 | Ciampa | 348/144 |
| 5,517,419 A | | 5/1996 | Lanckton et al. | |
| 5,604,534 A | * | 2/1997 | Hedges et al. | 348/117 |
| 5,625,409 A | * | 4/1997 | Rosier et al. | 348/117 |
| 5,878,356 A | | 3/1999 | Garrot, Jr. et al. | |
| 6,141,439 A | * | 10/2000 | Yoshida et al. | 382/154 |
| 6,442,292 B1 | * | 8/2002 | Otani et al. | 382/154 |
| 6,442,293 B1 | * | 8/2002 | Ito et al. | 382/154 |

FOREIGN PATENT DOCUMENTS

| | | |
|---|---|---|
| GB | 2 272 778 A | 5/1994 |
| WO | WO 98/26252 A2 | 6/1998 |

* cited by examiner

*Primary Examiner*—David L. Ometz
*Assistant Examiner*—Gevell Selby
(74) *Attorney, Agent, or Firm*—Foley & Lardner LLP

(57) ABSTRACT

Disclosed is an image formation system which supports a survey and a photographing free from errors in the field. A control point data storing section 50 stores control point data required for forming a first orthogonally projected image. An image data storing section 60 stores digitized photographed image from which the orthogonally projected image is formed. An additional survey control point data storing section 55 stores control point survey data obtained by additional survey in the field. An additional image data storing section 65 stores digital image data obtained by additional survey and photographing in the field. An orthogonally projected image formation section 70 integrates the control point data and the image data, thus forming and synthesizing a final orthogonally projected image. An orthogonally projected image acquirement plan making section 80 makes an orthogonally projected image acquirement plan for spots to be amended.

8 Claims, 13 Drawing Sheets

FLOWCHART FOR CALCULATING PHOTORGAPHING RANGE FOR ONE SHEET OF PHOTOGRAPH (STEP S640)

FLOWCHART OF ORTHOGONALLY PROJECTED IMAGE PREPARATION PROCESSINGS (S830)

IMAGE FORMATION SYSTEM

BACKGROUND OF THE INVENTION

The present invention relates to an image formation system, more particularly to an image formation system which prepares an orthogonally projected image from a centrally projected image such as photographs, and prepares and amends an image map so as to be able to understand field conditions by dimensioning a map on the image and superposing images on the map. Note that in this specification of this application, "photograph" shall contain a wide concept such as "acquire digital image," "detect digital image" and "take a picture."

According to prior arts, drawings obtained by surveying in a field have been prepared by paper, a pencil and the like typified by a plane table survey. Moreover, in recent years, line drawings of the fields have been prepared by a combination of a survey instrument and a portable computer typified by a digital plane table. In such conventional digital plane table, in order to acquire an image necessary for performing an orthogonally projected image preparation and three-dimensional data such as a control point, a rough plan for surveying and photographing a pertinent region was made, or alternatively works such as the survey and the photographing were conducted in the field without making any plan.

SUMMARY OF THE INVENTION

However, even when the actual surveys and photographings are performed after making the plans for them, the plans are the ones on a desk. Accordingly, failures and mistakes cannot be prevented practically, thus time and labor are required. Moreover, when survey data and photographed data are analyzed after bringing them back to an office, ineffective works such as resurveys and rephotographings must be often performed because the data is insufficient and useless.

From the above-described viewpoint, the object of the present invention is to remove the failures of the survey and the insufficiency of the data in the survey and photographing field in preparing and amending the orthogonally projected image. Another object of the present invention is to remove the time for re-photographing and re-surveying in the field. Still another object of the present invention is to provide an image formation system, which is capable of simulating a photographing plan based on a necessary precision and an orthogonally projected image preparation range so as to keep a conformity of a work on a desk to the actual work in the field, and is capable of selecting the optimal equipment, thus supporting the survey and photographing free from errors in the field.

The object of the present invention is to provide an image formation system, wherein the photographing conditions such as a photographing range, a photographing position, equipment to be used, and the number of photographs, which have been objects of surveys and photographing plan on a desk, are calculated and selected, acquirement of the image and the survey are made to be possible while actually giving instructions about them and confirming them in the field, thus enabling an effective orthogonally projected image preparation without failures, mistakes and re-photographing and re-surveying.

Moreover, the object of the present invention is to provide an image formation system in which anybody can simultaneously perform a simple survey and acquirement of the orthogonally projected image by using GPS.

Still another object of the present invention is to provide an image formation system which is capable of preparing sequentially a detail drawing of the orthogonally projected image by accumulating survey data and image data, and preparing the orthogonally projected image with a desired scale.

According to solving means of the present invention, an image formation system is provided, which comprises:
- a range setting section for setting a first range in which an orthogonally projected image is to be prepared;
- an information setting section for setting photographing camera information relating to a camera for photographing an image from which the orthogonally projected image is to be prepared;
- a range calculating section for obtaining a second photographable range based on the photographing camera information set by the foregoing information setting section; and
- a condition calculating section for calculating photographing conditions to obtain a photographing image from which the orthogonally projected image can be properly formed in the first range set by the foregoing range setting section based on the second range obtained by the foregoing range calculating section.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Embodiments of an image formation system according to the present invention will be described with reference to the accompanying drawings below.

(1) Total Constitution

First of all, a total constitution of the image formation system and an outline of an operation thereof will be described.

Figure 1:
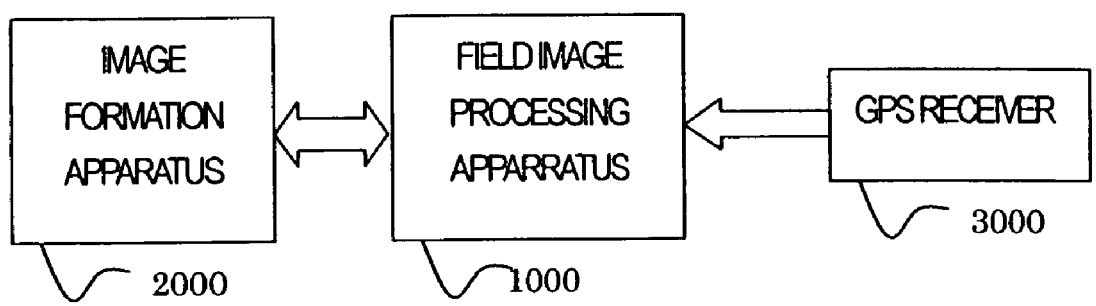
FIG. 1 shows a constitution of the whole of an image formation system according to the present invention.

FIG. 1 is a total constitution of the image formation system of the present invention. The image formation system comprises an image formation apparatus 2000, a field image processing apparatus 1000 and a GPS receiver 3000. The image formation apparatus 2000 forms mainly an orthogonally projected image. The field image processing apparatus 1000 performs amendments, preparations and confirmations of the orthogonally projected image in a field. The GPS receiver 3000 confirms a present position and spots to be amended. Although the image formation apparatus 2000 and the field image processing apparatus 1000 are built separately in the image formation system here, these apparatuses may be united into one. Moreover, the GPS receiver 3000 may be included in the unit composed of these apparatuses.

Next, an outline of an operation of the image formation system will be described.

Figure 2:
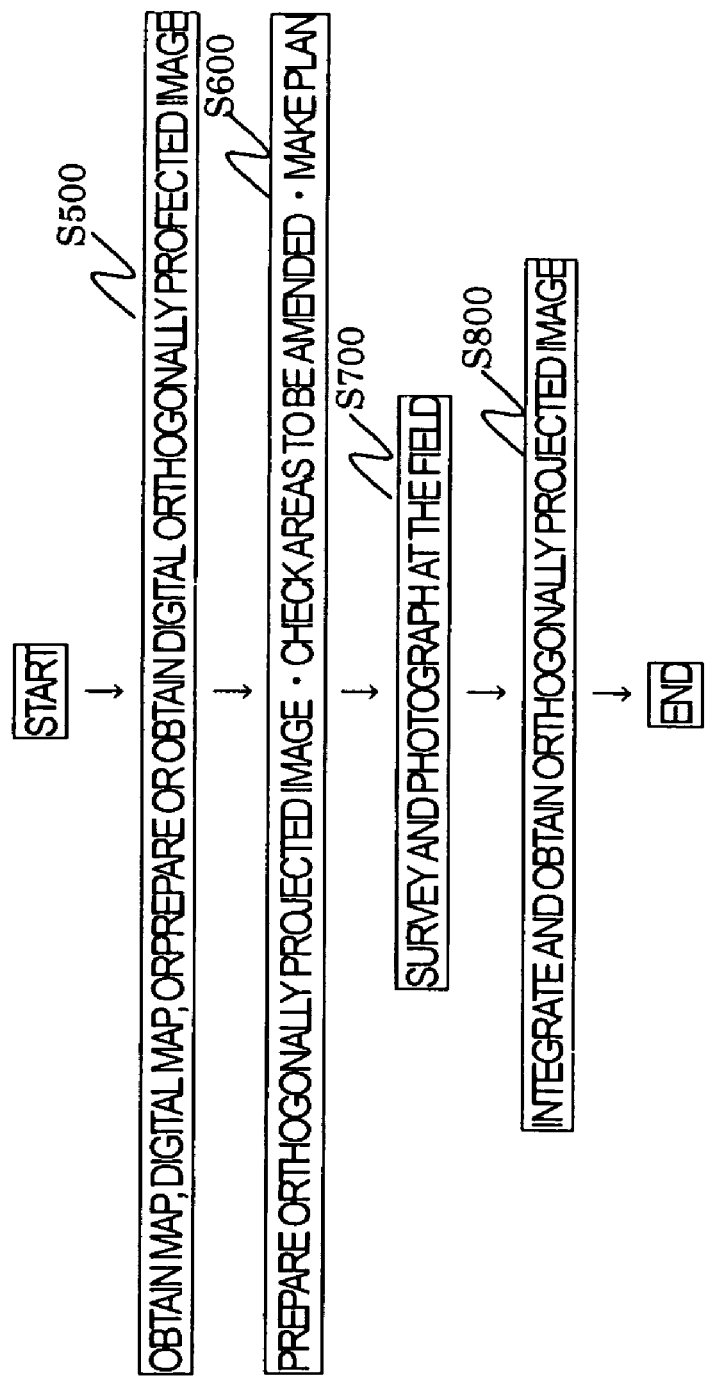
FIG. 2 is a schematic flowchart for preparing an orthogonally projected image.

A schematic flowchart for preparing the orthogonally projected image is shown in FIG. 2. Note that the preparation of the orthogonally projected image and the amendment thereof are executed based on a map in accordance with the same processing except that only a material used for a preparation or an amendment differs.

First of all, when the preparation of the orthogonally projected image is attempted, a map of a region for which the orthogonally projected image is prepared, a digital map is obtained (S500). In the case of the map, data concerning the map is read by a scanner or the like, and a digital map obtaining by vectorizing it may be used. Or, the digital map may be merely used as a reference. When the orthogonally projected image is prepared from the photographed image, the image formation apparatus 2000 performs the preparation (S500). The image for preparing the orthogonally projected image includes an image photographed from an airplane or a platform (such as a kite-balloon, a radio-controlled model helicopter and a crane truck), a satellite image and the like. Or, such images available on the market may be used. Moreover, if digital orthogonally projected image data of spots which are desired to be investigated and control point data on the image can be obtained, they may be used by obtaining them. On the other hand, when the orthogonally projected image is amended, the already prepared orthogonally projected image is used.

Next, spots to be desired to be made in the form of images, spots that were not made in the form of images in the previous preparation processing, and areas that are desired to be investigated and additionally surveyed are checked, and an orthogonally image acquiring plan is made (S600). The surveyor travels to a location where the preparation of the orthogonally projected image is desired or where images were not made in the previous investigation or the investigated result are to be amended while navigating by the GPS and the like, and performs the survey and the photographing at the field (S700). Then, a final orthogonally image is obtained by integrating investigation data and image that are obtained in the field, images that have been prepared and obtained, and control point data if this exists (S800).

(2) Constitutions of Apparatuses of the Image Formation System

An outline of each apparatus built in the image formation system will be described below.

First of all, the description of the image formation apparatus 2000 will be made.

Figure 3:
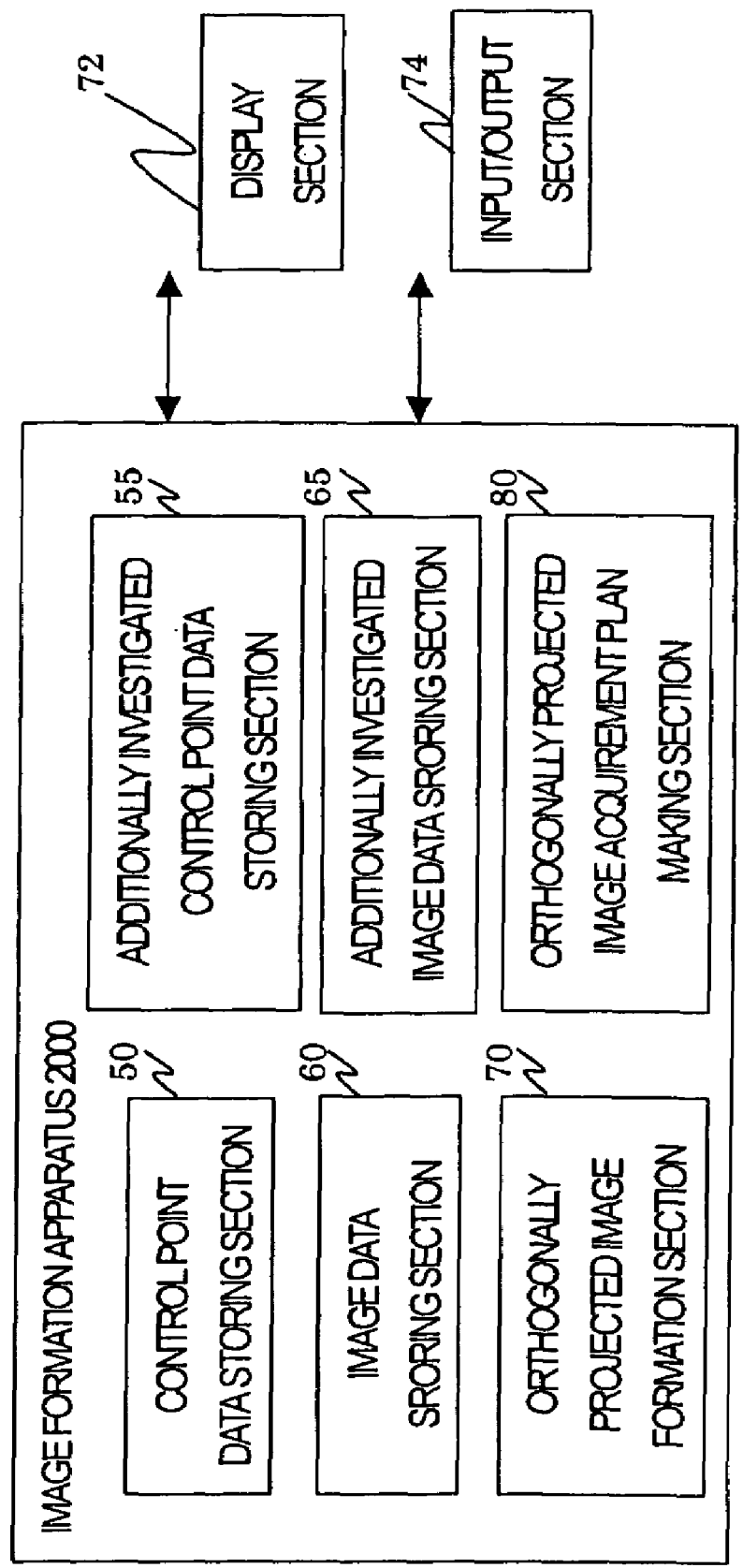
FIG. 3 is a diagram showing a constitution of an image formation apparatus 2000.

The constitution of the image formation apparatus 2000 is shown in FIG. 3. The image formation apparatus 2000 comprises a control point data storing section 50, an image data storing section 60, an additionally investigated control point data storing section 55, an additionally investigated image data storing section 65, an orthogonally projected image formation section 70 and an orthogonally projected image acquirement plan making section 80. Moreover, the image formation apparatus 2000 has a display section 72 and an input/output section 74 either outside or inside thereof. Such means (function) can be realized by, for example, a personal computer (PC) and the like.

The control point data storing section 50 is a portion for storing the control point data required for preparing the first orthogonally projected image. The image data storing section 60 is a portion for storing a digitized photographed image from which the orthogonally projected image is prepared. The additionally investigated control point data storing section 55 is a portion for storing the control point survey data which is additionally investigated in the field. The additionally investigated image data storing section 65 is a portion for storing digital image data which is additionally investigated and photographed in the field. The orthogonally projected image formation section 70 is a portion which integrates the control point data and the image data and thus prepares and synthesizes the final orthogonally projected image. Moreover, the orthogonally projected image acquirement plan making section 80 is a portion for making an orthogonally projected image acquirement plan for spots to be amended.

Furthermore, the display section 72 performs a two-dimensional displaying or a three-dimensional displaying like a CRT, a liquid crystal display and a plasma display. The display section 72 displays the orthogonally projected image formed by the orthogonally projected image formation section 70 and various kinds of data. The input/output section 74 inputs/outputs various kinds of image data and three-dimensional coordinate data of a survey instrument. As the input/output section 74, various kinds of input devices and output devices such as an optical disc apparatus, a recording medium taking a card type (HDD, a memory), a floppy disc, a key board, a pen, a mouse, a CD-ROM disc drive can be provided.

Next, the orthogonally projected image acquirement plan making section 80 will be described in detail.

Figure 4:
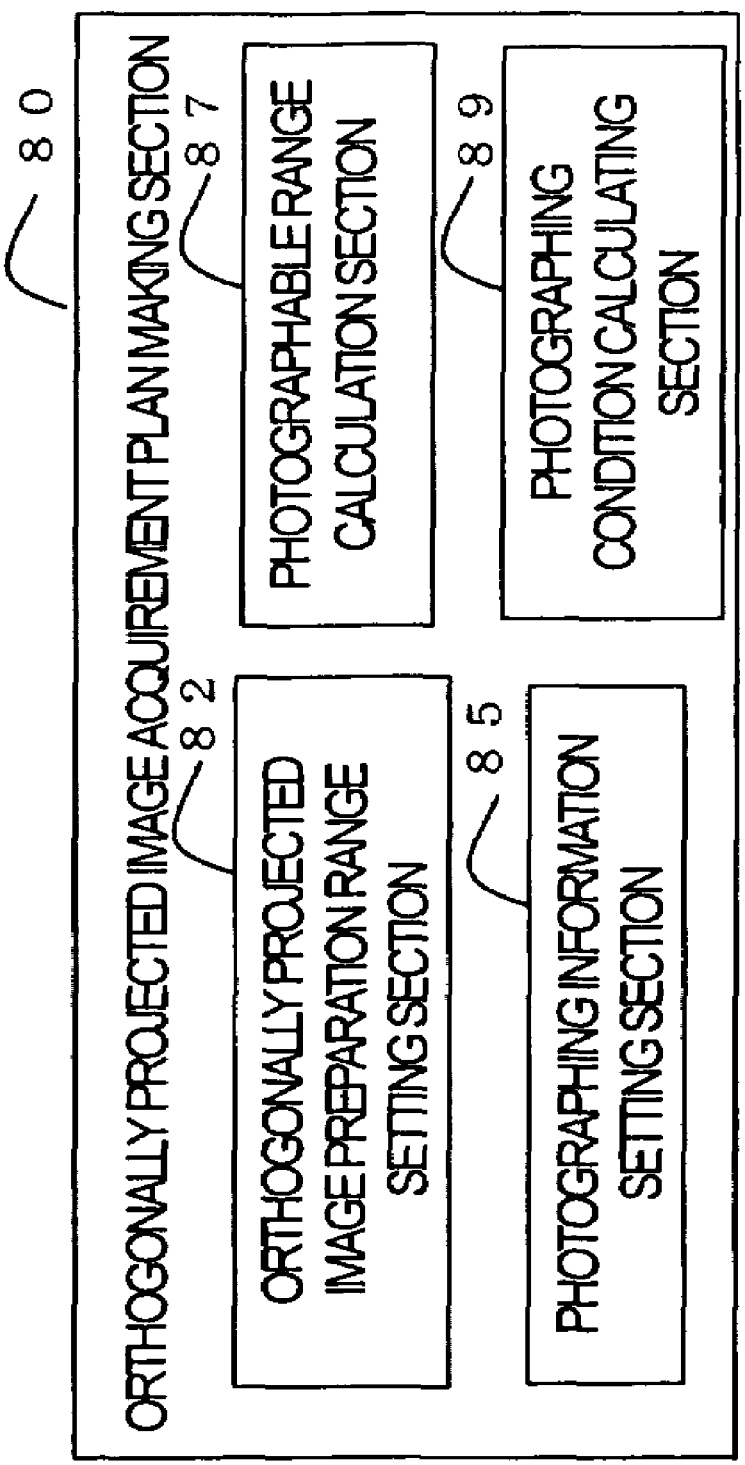
FIG. 4 is a diagram showing a constitution of an orthogonally projected image acquirement plan making section 80.

FIG. 4 shows a constitution of the orthogonally projected image acquirement plan making section 80. The orthogonally projected image acquirement plan making section 80 comprises an orthogonally projected image preparation range setting section 82, a photographing information setting section 85, a photographable range calculating section 87 and a photographing condition calculation section 89. Such means (function) can be realized by, for example, a personal computer (PC) and the like.

The orthogonally projected image preparation range setting section 82 sets an orthogonally projected image preparation range in which the preparation of the orthogonally projected image is desired. The photographing information setting section 85 sets photographing camera information for photographing an image from which the orthogonal projected image is prepared. Here, the photographing camera information is information of a camera to be used and various kinds of photographing information. For example, the photographing camera information is at least one of an angular field of the photographing lens, a size of the photographing plane, a focal length of the photographing lens, a photographing position in which the orthogonally projected image preparation range and the position are related to each other, a pixel size of the CCD, and a reading precision of the film plane. In the photographing information setting section 85, information such as information on a camera for photographing a still picture or a camera for photographing a moving picture, information of a ground photographing and an aerial photographing, and information of a required precision can be set.

The photographable range calculating section 87 calculates the orthogonally projected range which can be photographed and the like, based on the set information such as the photographing camera information. The photographing condition calculating section 89 calculates the photographing conditions for obtaining the photographed image from which the orthogonally projected image can be appropriately formed in the orthogonally projected image preparation range, based on the photographable range. Here, in the case of the camera for photographing the still picture (still camera), the photographing condition is at least one of the number of times of the photographings, a photographing direction, a photographing angle, and a photographing position. In the case of the camera for photographing the moving picture (video camera), the photographing condition is at least one of the photographing direction, the photographing angle, a movement direction, a movement speed and a photographing position. Moreover, in the case of the aerial photographing, the photographing condition calculating section 89 calculates the photographing conditions including a flight attitude. On the other hand, in the case of the ground photographing, the photographing condition calculating section 89 calculates the photographing conditions including a photographing angle and an angular field.

Next, the field image processing apparatus 1000 will be described.

Figure 5:
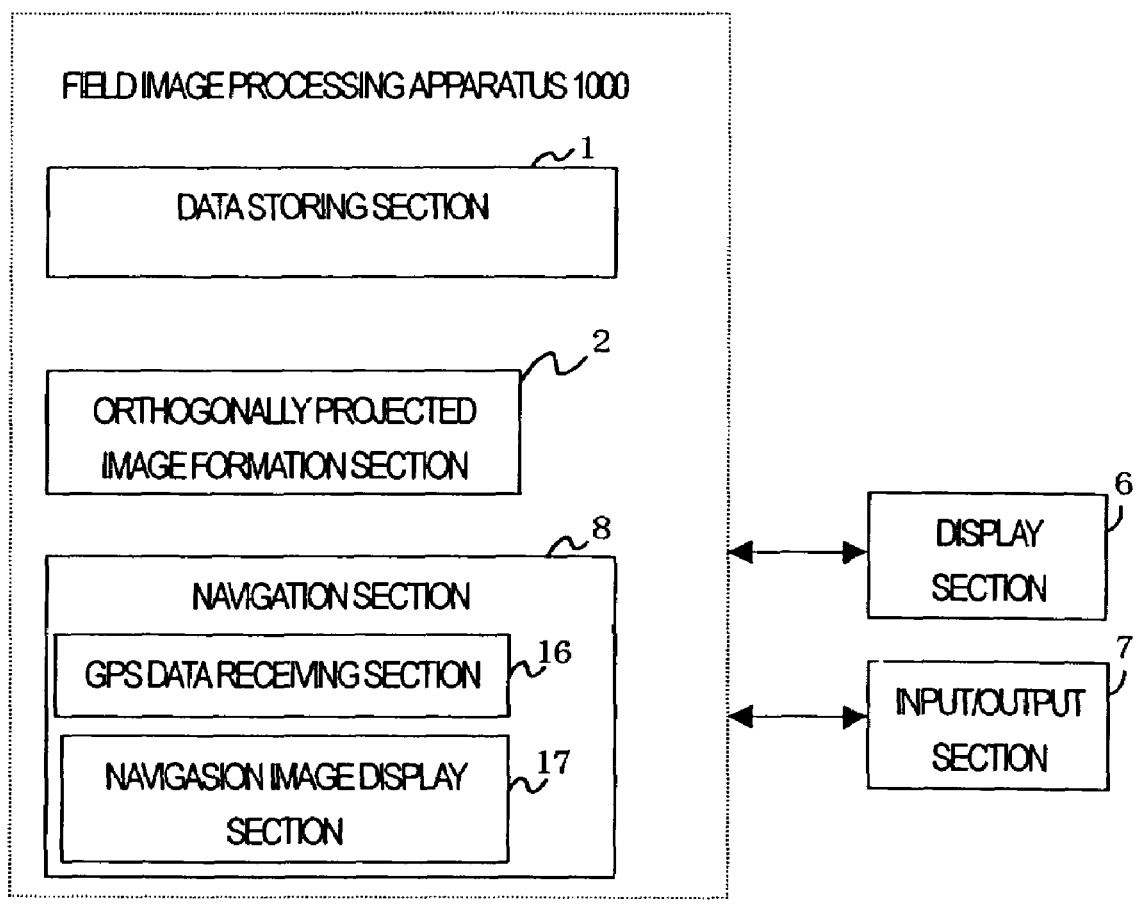
FIG. 5 is a diagram showing a constitution of a field image processing apparatus 1000.

The constitution of the field image processing apparatus 1000 is shown in FIG. 5. The field image processing apparatus 1000 comprises a data storing section 1 for storing various kinds of data, an orthogonally projected image formation section 2 and a navigation section 8. The field image processing apparatus 1000 has a display section 6 and an input/output section 7 inside or outside thereof. Such means can be realized by, for example, a portable personal computer (PC).

The data storing section 1 previously stores three-dimensional data and image data measured by an survey instrument or the like and map data. The orthogonally projected image formation section 2 is the same as the orthogonally projected image formation section 70 in the image formation apparatus 2000. The navigation section 8 has a GPS data receiving section 16 and a navigation image display section 17. The navigation section 8 allows the navigation image display section 17 to display information relating to the present position received from the GPS by the GPS data receiving section 16, and the navigation section 8 is used by the surveyor for knowing the present position where the surveyor currently exists and moving to a place where the orthogonally projected image is prepared, additionally investigated, and amended. The navigation section can confirm the orthogonally projected image amended by the navigation image display section 17. Note that the navigation image display section 17 may serve as the display section 6.

The display section 6 performs a two-dimensional displaying or a three-dimensional displaying such as a CRT, a liquid crystal display or a plasma display. The display section 6 displays the orthogonal projected image formed by the orthogonal projected image formation section 2 and data stored in the data storing section 1. The input/output section 7 inputs/outputs various kinds of data and three-dimensional coordinate data from a three-dimensional coordinate input apparatus of the survey instrument or the like from/to other apparatuses. As the input/output section 7, various kinds of input devices and output devices such as an optical disc device, a recording medium taking a card type (HDD, a memory), a floppy disc, a key board, a pen, a mouse, a CD-ROM disc drive can be provided. The display section 6 and the input/output section 7 of the field image processing section 1000 can be used as the display section 72 and the input/output section 74 of the image formation apparatus 2000. Alternatively, the display section 72 and the input/output section 74 of the image formation apparatus 2000 can be used as the display section 6 and the input/output section 7 of the field image processing section 1000.

(3) Detailed Description of Processing Operations

A schematic flowchart for preparing the orthgonally projected image shown in FIG. 2 will be described according to a detailed flowchart.

(3-1) Orthogonally Projected Image Preparation Processing, Checking Processing of Spots to be Amended, and Processing for Making Survey Plan (Step S600)

Figure 6:
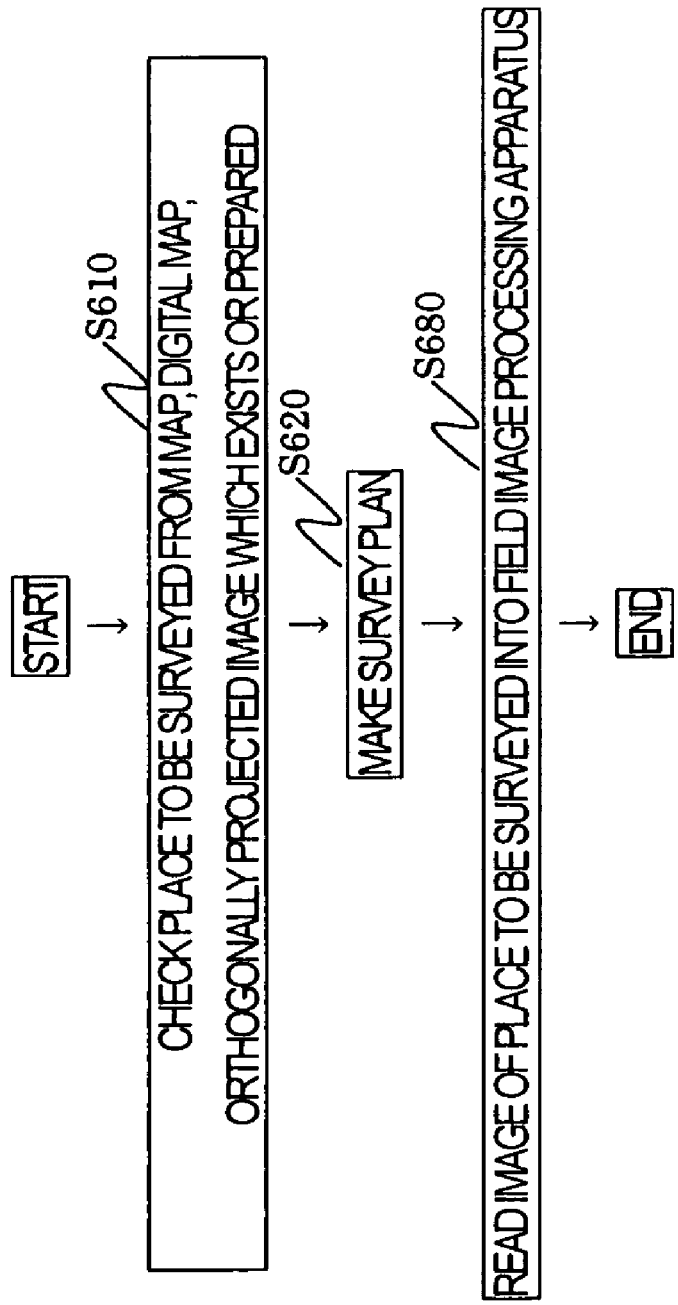
FIG. 6 is a flowchart concerning an orthogonally projected image preparation, checking spots to be amended and processings for making a survey plan.

A flowchart concerning the orthogonally projected image preparation processing, the checking processing of spots to be amended, and the processing for making a survey plan is shown in FIG. 6. In the orthogonally projected image preparation processing, the checking processing of spots to be amended, and the processing for making a survey plan (step S600), based on the map or the image prepared or obtained in step S500, places for which it is intended to prepare the orthogonally projected image and places having less data or for which further survey has to be performed are confirmed (step S610). Then, a survey plan is made by the orthogonally projected image acquirement plan making section 80 in the image formation apparatus 2000, in preparing the orthogonally projected image and amending it (step S620).

Figure 7:
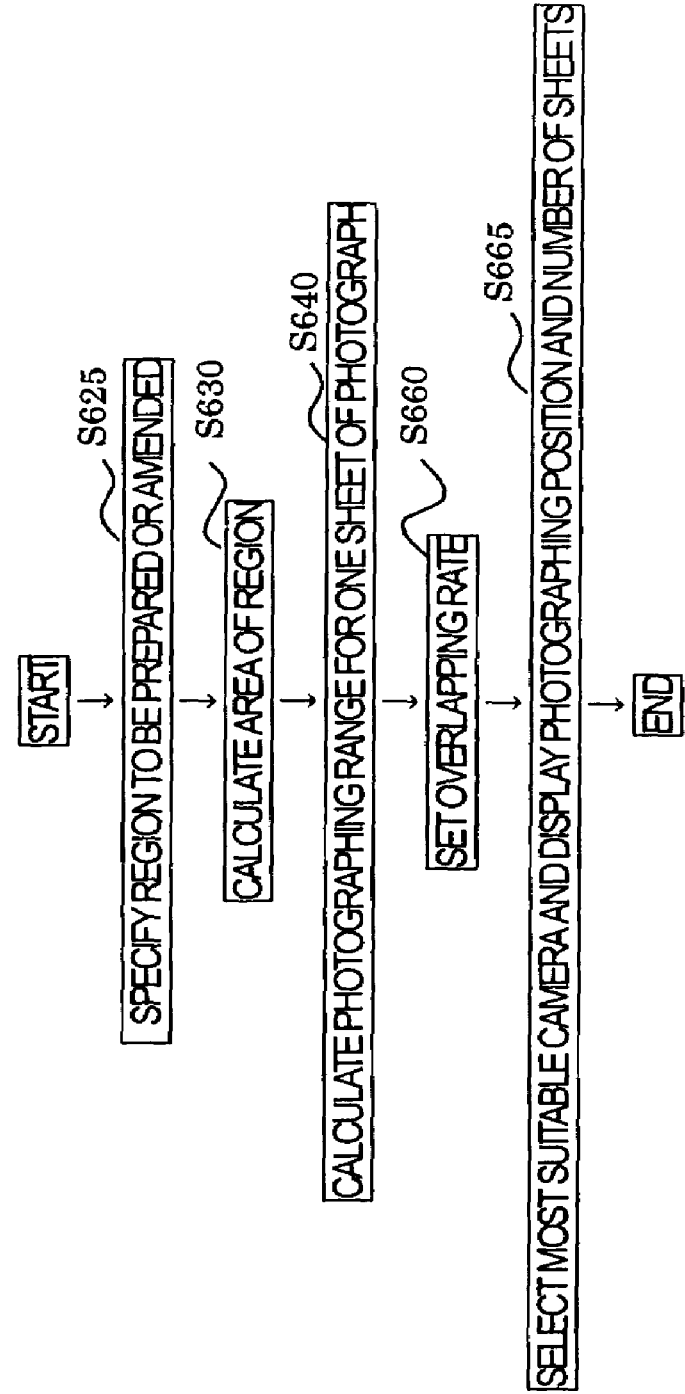
FIG. 7 is a flowchart concerning making a survey plan.

A flowchart concerning the survey plan making is shown in FIG. 7. The survey plan making in the step S 620 by the orthogonally projected image acquirement plan making section 80 is further described in detail.

First of all, regions to be prepared or amended based on the map or the image which was prepared or obtained in the step S500 are specified by the input/output section 74 having the input/output device such as a pen and a mouse (S625). The specified data is set in the orthogonally projected image preparation range setting section 82. When the orthogonally projected image exists, the orthogonally projected image is displayed, and then the region is specified. In the case of the digital map, these are read out. The region displayed on the display screen about the map is specified. Moreover, when only the map is obtained, the numerical data as to this map may be entered. Alternatively, a scale of the image to be acquired is adjusted, and the screen is made to stand by the orthogonally projected image display. However, at this time, an image is not displayed. The same size as that of an area to be specified may be specified by an input device such as a cursor and a pen.

Next, an area of the region is calculated (step S630). In this case, since input data obtained by the step S500 corresponds to an actual value, the area of the region can be obtained with calculations of x-coordinates and y-coordinates. Photographing conditions that are various kinds of parameters necessary for photographing by a camera to be used are calculated by the photographing condition calculating section 89, and the photographing range at the time of photographing one sheet of photograph is calculated by the photographable range calculating section 87 (step S640). Setting of various kinds of information such as the photographing conditions necessary for the photographing is set in the photographing information setting section 85. Detailed procedures of the calculation processing at the time of photographing one sheet of photograph will be described later.

Next, a summary overlapping rate is set based on the photographing range calculated for one sheet of photograph (step S660). The overlapping rate is ordinarily 10%, and, in the case of a stereo photographing, the overlapping rate can be set to 60%. Next, based on the area of the region previously calculated and the overlapping rate, the photographing position and the number of sheets of photographs are calculated (step S665). Since an aerial photographing from a platform is ordinarily vertical photographing, the photographing position is a center of the photographing range for one sheet of photograph. On the other hand, in the case of land photographing, the photographing position is calculated by relations of a photographing angle, an angular field, a photographing distance and a photographing range. Then, the photographing position and the number of sheets of photographs are displayed on the orthogonally projected image (step S665). Based on the photographing position and the number of sheets of photographs obtained in the above described manner, a most suitable camera is selected, and the survey and the photographing in the field can be performed depending on the photographing conditions such as the photographing position and the number of sheets of photographs.

Figure 8:
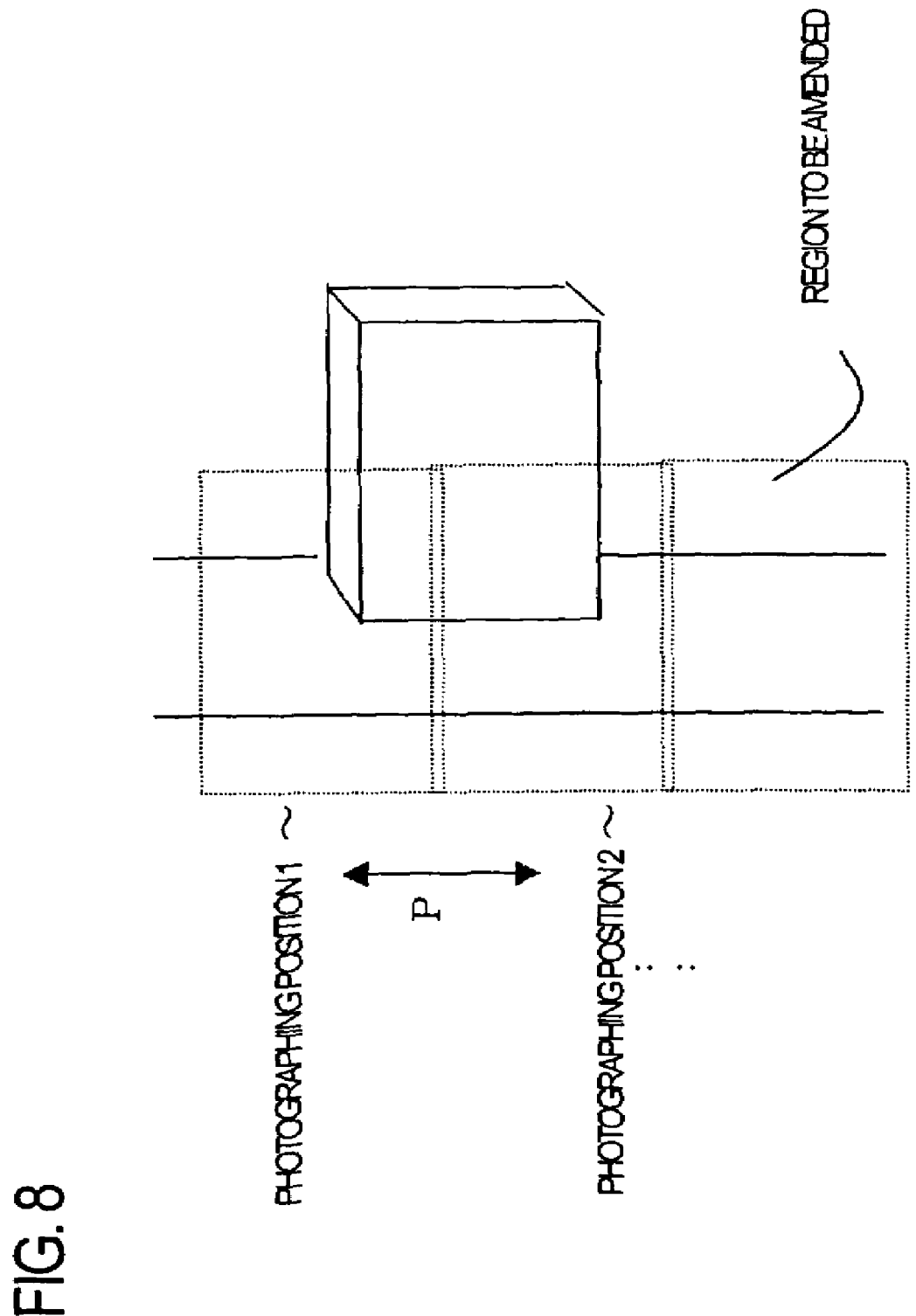
FIG. 8 is an explanatory view concerning a photographing position of the orthogonally projected image.

FIG. 8 is an explanatory view concerning a photographing position of the orthogonally projected image.

In FIG. 8, when, for example, a plurality of cameras and camera lenses are set, the ones showing the least number of sheets of photographs are displayed. As a matter of course, all of the set ones can be displayed. It is possible to display them according to the priority order. In the case of the aerial photographing, the most preferable platform, the flight altitude and the photographing distance can also be displayed. Moreover, when photographing is performed by a video camera mounted on a car, the photographing speed is calculated in accordance with the photographing range and the photographing position, and displayed. For example, when a movement distance from the photographing position 1 to the photographing position 2 is P (m) and it is intended to photograph at least one sheet of photograph per one second, the minimum movement speed is calculated by the following formula.

Minimum movement speed (m/hour)=P×60×60

Then, the orthogonally projected image including a place to be surveyed, a digital map and various kinds of photographing conditions are respectively transferred to the data storing section 1 of the field image processing apparatus 1000 constituted by, for example, a portable computer, and read thereinto (step S680). If these are constituted on the same apparatus, the transfer and the reading need not to be performed. Since the survey plan has been made as described above, the step proceeds to a processing of a survey, a photographing, an additional survey and an amendment in the field.

The detail of the calculation of the photographing range for one sheet of photograph in the step S640 will be described.

Figure 9:
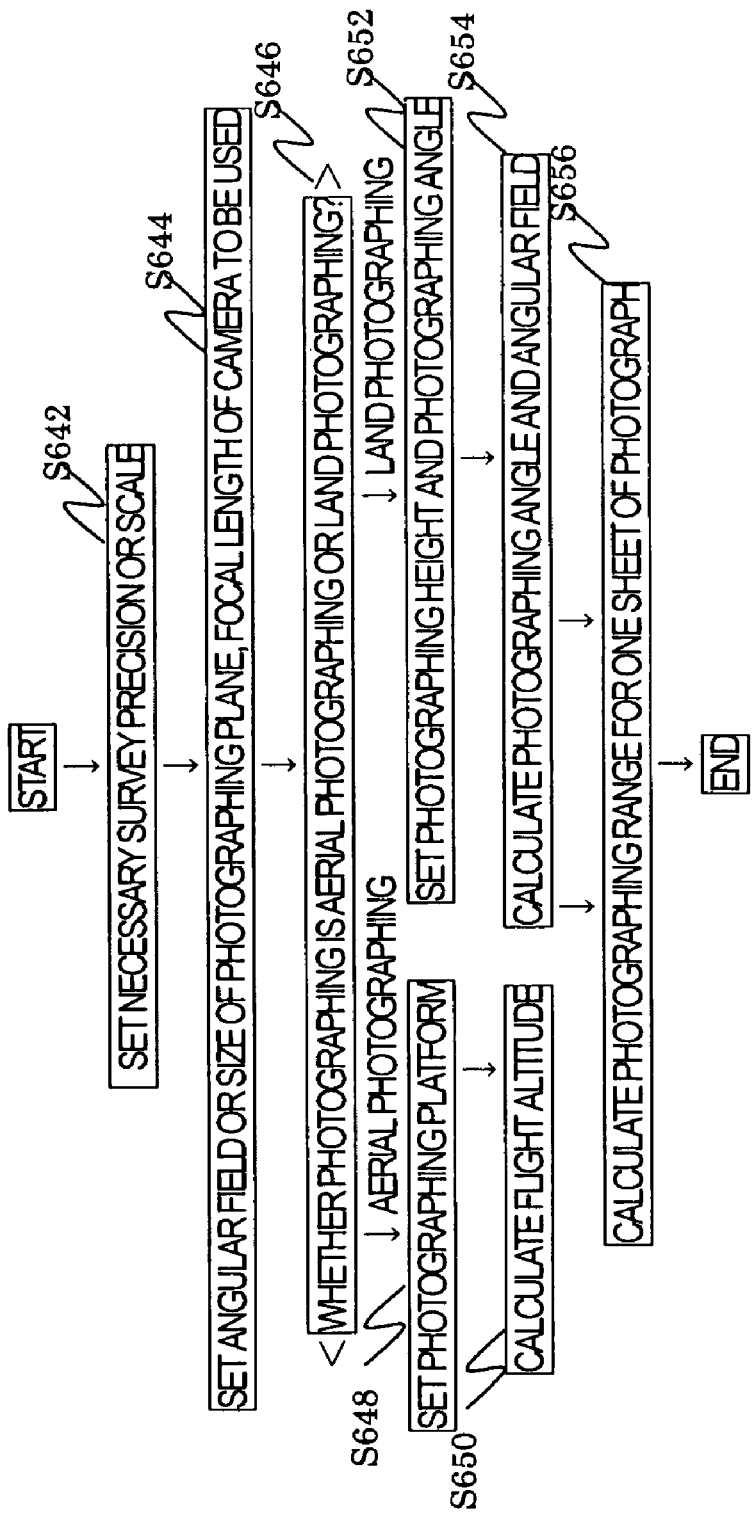
FIG. 9 is a flowchart concerning one sheet photograph range calculation.

A flowchart for calculating the photographing range for one sheet of photograph is shown in FIG. 9. A necessary survey precision or a scale is first set (step S642). Here, it is determined with at least what precision, for example, on the order of several centimeter or several tens centimeter, the survey is conducted, or it is determined what image scale is desired. The determined precision and the determined image scale are set. Next, the photographing camera information of a usable camera such as an angular field of a lens, a size of a photographing plane, and a focal length is set to the photographing information setting section 85 (step S644). When there are a plurality of setting conditions and a plurality of cameras, a plurality of photographing camera information are set. If a size d of the photographing plane is found, the angular field θi is obtained by the following formula. Accordingly, the size d of the photographing plane instead of the angular field may be entered.

$$\theta i = 2 \tan^{-1}((d/2)/f)$$

where θi is the angular field, d is a size of the photographing plane and f is a focal length.

Next, it is decided whether the photographing is an aerial photographing or a land photographing, and the subsequent procedure is parted (step S646).

Descriptions for the aerial photographing will be first made. When the aerial photographing is performed, the flight altitude is a problem. Since the flight altitude differs depending on the photographing platform such as a kite-balloon, a radio-controlled model helicopter and a crane truck, the photographing platform to be used is set (step S648). When a plurality of platforms are possessed, the plurality of platforms may be set. Then, the flight altitude H is calculated by the following formula (step S650). Note that δs in the following formula is a value set previously in the step S642 as a required precision. In the case of a scale, δs is converted to a proper value and set. Moreover, in the case where a digital still camera is used, δp is a pixel size. In the case where a film camera is used, δp is a reading-out precision of a scanner.

$$H=(\delta s \cdot f)/\delta p$$

where H is a flight altitude, δs is a required precision and δp is a pixel size of a CCD or a reading-out precision of a film plane.

Next, the photographable range calculating section 87 calculates the photographing range R equivalent to one sheet of photograph by the following formula. When the plurality of cameras and lenses are selected, the number of calculations corresponding to the number of cameras and lenses are performed.

$$R=H \cdot \tan(\theta i)$$

where θi is an angular field.

Returning to FIG. 7, a step proceeds to a processing of setting the overlapping rate (step S660). As described above, a proper platform can be selected based on one of the photographing camera information such as the angular field θi of the lens, the required precision δs, the calculated flight altitude H and the photographing range R.

Next, the description for the land photographing will be described.

Figure 10:
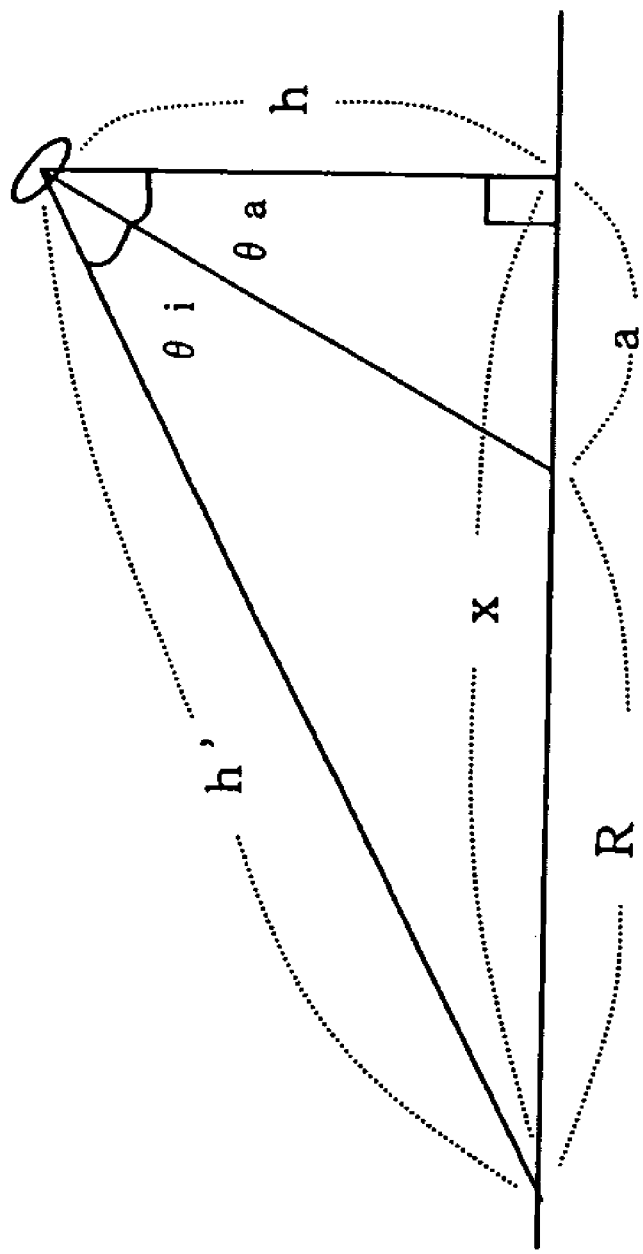
FIG. 10 is an explanatory view concerning a relation between a photographing range and an angle.

An explanatory view concerning the relationship between the photographing range and the angle is shown in FIG. 10.

In FIG. 10, the photographing is performed using a camera with an angular field $\theta i$ when the photographing height and the photographing angle are h and $\theta a$, respectively. In this case, since the photographing by a camera placed in the image formation system or the photographing by a camera held by hand is performed, the photographing height h is decided to some extent. When this photographing height h is set to the photographing information setting section 85, and the photographing angle $\theta a$ is also set if it is decided (step S652). When the photographing height h is decided, the photographing condition calculating section 89 decides the angular field by the lens and the photographing angle is decided by the following formula (step S654).

$$\theta a + \theta i = \cos^{-1}((h \cdot \delta p)/(\delta xy \cdot f))$$

where $\delta xy$ (=(h/f)·$\delta p$) is a pixel resolution (h: a photographing height, f: a focal length of the lens, $\delta p$: a CCD pixel size).

Next, the photographable range calculating section 87 determines the photographing range R by the following formula (step S656). When the plurality of lenses are selected, a lens having the widest range is selected based on a focal length of a manual photograph and an angular field.

$$R = h(\tan(\theta i + \theta a) - \tan \theta a)$$

The above described processings are performed for the case where the survey and the photographing are performed for each sheet of the image. When the stereo photographing is performed, the optimum base length B is also calculated by the following processing, and output.

$$B = (H^2 \delta p)/(f \delta s)$$

(3-2) Survey Processing and Photographing Processing in the Field (Step S700)

Next, the survey processing and the photographing processing in the field (step S700) are described in detail.

Figure 11:
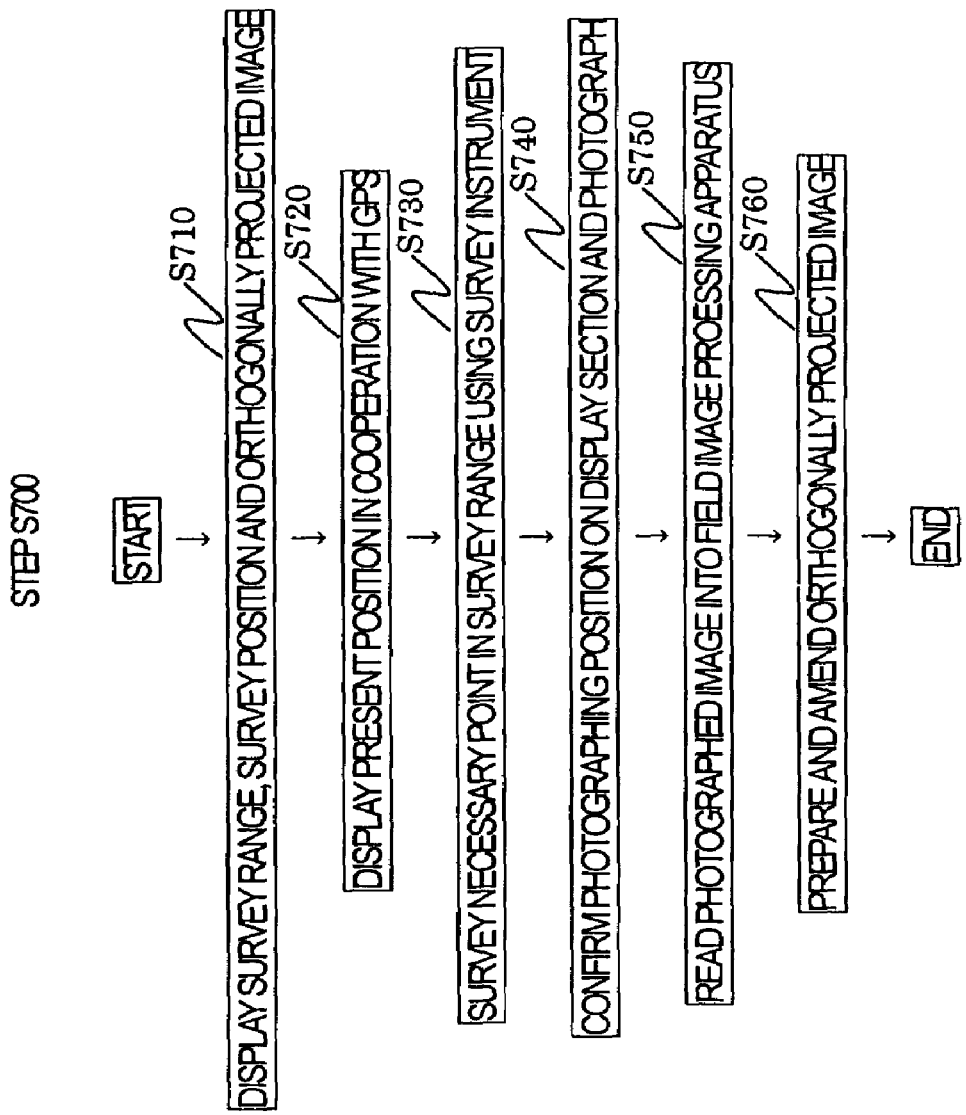
FIG. 11 is a flowchart concerning survey and photographing processings in a field.

A flowchart concerning the survey processing and the photographing processing in the field is shown in FIG. 11.

The surveyor goes to the field to be surveyed, and a survey range and the survey position are displayed on the field image processing apparatus 1000 constituted by a portable computer and the like (step S710). Here, when the orthogonally projected image exists already, the survey range and the survey position are displayed on the orthogonally projected image. When the digital map exist, the survey range and the survey position are superposed on the maps, and then displayed on the display screen. When the orthogonally projected image and the maps do not exist, only the photographing range and the photographing position are displayed. Note that coordinate system of these displays and scales are set to desired values. Then, the field image processing apparatus 1000 allows the present position to be displayed thereon in cooperation with the GPS (step S720).

The surveyor confirms a range to be surveyed while watching the display, and the surveyor surveys points necessary for preparing the orthogonally projected image in the photographing range, spots to be surveyed in detail and positions to be additionally surveyed using a survey instrument such as a GPS and a total station (step S730). If six or more survey spots first exist in one photographing range, no survey should be performed. However, when they do not exist, when the detail survey is further required, or when amendments are desired, the surveys of the spots are previously performed. The surveyor goes to an accurate photographing position while watching the display of the photographing position and the present position by the GPS, and photographs an image of the place by a digital camera or the like, under conditions of a predetermined focal length and an angular field in a predetermined photographing direction obtained by the orthogonally projected image acquirement plan making section 80 (step S740). Or, when the photographing is performed by a camera mounted on a car, the display section 6 on the portable computer or the navigation image display section 17 is observed while navigating by the GPS, and the photographing is performed at the photographing position. When the photographing is performed by a video camera, the video camera runs in the photographing position at an obtained movement speed, thus obtaining an image by the photographing using the video camera. Here, when an aerial photographing is necessary, the photographing is performed while adjusting the image and the photographing position using various kinds of platforms such as a balloon and a helicopter.

When the photographing is completed, the photographed image is read into the field image processing apparatus 1000 (step S750). Next, the orthogonally projected image preparation processing and the amendment processing are performed (step S760). The orthogonally projected image preparation processing and the amendment processing can be performed using the orthogonally projected image formation section 70 of the image formation section 2000 or the orthogonally projected image formation section 2 of the field image processing section 1000. If a satisfactory orthogonally projected image cannot be obtained in this step, the processing of the step S700 should be repeated until a satisfactory orthogonally projected image can be obtained. Moreover, when the orthogonally projected image and the digital map do not first exist, the photographing range and the photographing position are displayed based on the prepared orthogonally projected image in this step. If the need arises, the step S700 can be repeated. Detailed procedures for preparing the orthogonally projected image will be described later.

In the above descriptions, although the various kinds of information such as the photographing camera information has been set in the photographing information setting section 85, the various kinds of information can also be set to a proper recording apparatus such as the data storing section 1 of the field image processing apparatus 1000, and stored therein.

(3-3) Orthogonally Projected Image Integration Preparation Processing (Step S800)

Next, an orthogonally projected image integration preparation processing (step S800) will be described.

Figure 12:
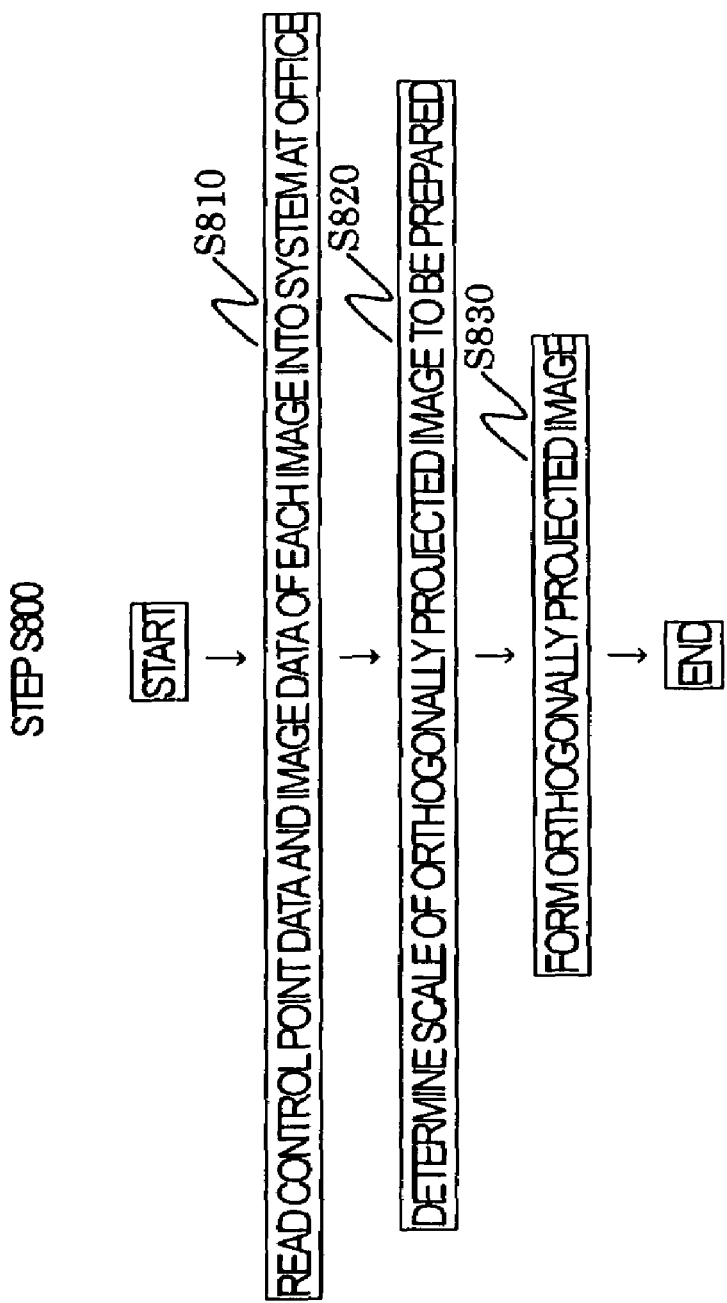
FIG. 12 is a flowchart concerning orthogonally projected image unifying processings.

A flowchart concerning the orthogonally projected image integration preparation processing is shown in FIG. 12. The processing in this step is executed by reading image data and data surveyed in the field into the image formation apparatus 2000 (step S810). The below description is done for the case where the orthogonally projected image is previously acquired or obtained. However, even when the orthogonally projected image does not exist, the following processing can be executed by considering that corresponding data does not exist.

In the image formation apparatus 2000, the control point data surveyed in the field is inputted to the additional survey control point data storing section 55, and the image data is inputted to the additional survey image data storing section 65. The image data of the first orthogonally projected image is inputted to the image data storing section 60, and its control point data is inputted to the control point data storing section 50. When the orthogonally projected image does not previously exist, the control point data surveyed in the field is inputted to the control point data storing section 50, and the image data is inputted to the image data storing section 60.

The control point data stored in the control point data storing section 50 and the additional survey control point data storing section 55 can be stored in a state where they are mixed, and both of them are used. Then, when a scale of the orthogonally projected image to be prepared is determined (step S820), a preparation of the orthogonally projected image is performed by an orthogonally projected image formation processing as described later (step S830). Note that the orthogonally projected image integration preparation processing (step S800) can be performed by the field orthogonally projected image preparation system 1000 not by the digital image formation apparatus 2000.

Details of the orthogonally projected image preparation processing (step S830) by the orthogonally projected image formation section 70 or 2 will be described.

Figure 13:
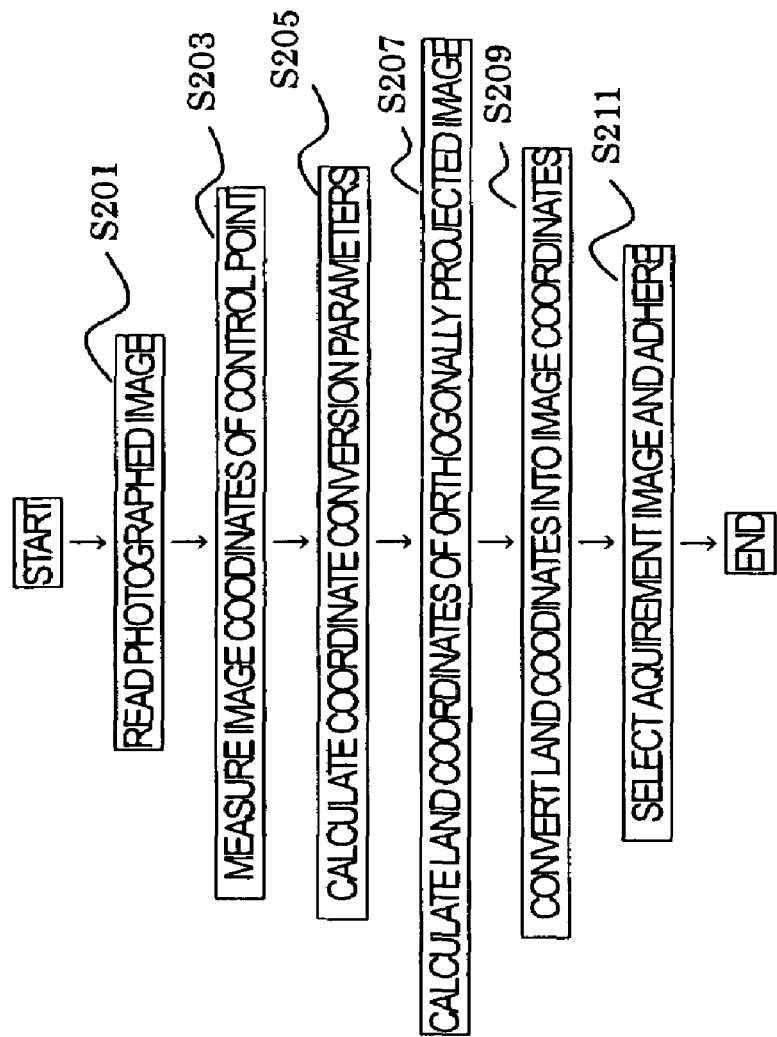
FIG. 13 is a flowchart of orthogonally projected image preparation processings.

A flowchart of the orthogonally projected image preparation processing is shown in FIG. 13.

When the orthogonally projected image is prepared, the photographed image is read (step S201). Next, the image coordinates of the six or more photographed control points photographed onto the photographed image are measured (step S203). The photographed control points photographed are obtained by previously surveying the land coordinates by a survey instrument. Next, the image coordinates and the land coordinates are made to correspond to each other, and coordinate conversion parameters are obtained (step S205). This is performed by the three dimensional projective transformation formula shown below.

$$x = \frac{L_1 X + L_2 Y + L_3 Z + L_4}{L_9 X + L_{10} Y + L_{11} Z + 1}$$

$$y = \frac{L_5 X + L_6 Y + L_7 Z + L_8}{L_9 X + L_{10} Y + L_{11} Z + 1}$$

(x, y): image coordinates
(X, Y, Z): land coordinates
$L_1$ to $L_{11}$: coordinate transformation parameter When the formula is solved using a least squares method, the transformation parameters of $L_1$ to $L_{11}$ for determining a relation between the image coordinates (x, y) and the three dimensional coordinates (X, Y, Z).

Next, the land coordinates of each pixel on the orthogonally projected image are calculated (step S207). In this processing, to prepare the orthogonally projected image, the image coordinates (x, y) of the orthogonally projected image are transformed to the land coordinates (X, Y, Z). The land coordinates (X, Y, Z) are calculated using the transformation parameters previously obtained in the step S205 for the coordinate transformation parameter calculation processing. The land coordinates (X, Y, Z) corresponding to the image coordinates (x, y) of the orthogonally projected image are given by the following formula. In such manner, the acquirement position of each pixel on the orthogonally projected image can be obtained.

$$X = X_0 + x \Delta X$$

$$Y = Y_0 - y \Delta Y$$

$$Z = -\frac{aX + bY + d}{c}$$

$(X_0, Y_0)$: a position in the upper left of the orthogonally projected image in the land coordinate system $(\Delta X, \Delta Y)$: a size of one pixel in the land coordinate system (example: m/pixel)

(x, y): image coordinates of the orthogonally projected image (X, Y, Z): land coordinates (three dimensional coordinates)

a, b, c, d: coefficients of a plane equation formed by a plurality of control points which interpolate certain image coordinates (x, y)

Using the transformation parameters obtained in the step S205, the image coordinates (x, y) corresponding to the land coordinates (X, Y, Z) obtained by the Formula 1 in the step S207 are calculated (S209). Based on the image coordinates (x, y) obtained in such manner, a value of density on the land coordinates (X, Y, Z) of the pertinent image is acquired. This value of density is a density of a pixel in the two dimensional position (X, Y) on the orthogonally projected image. In the above described manner, an image density to be adhered to the position (X, Y) on the land coordinates is acquired. By performing the above described processings for all pixels of the orthogonally projected image, an image adhesion is performed (step S211). Moreover, when the image adhesion is performed, the image adhesion is performed while transforming the selected image to a resolution corresponding to a desired scale. Although the image adhesion concerning the image density was described, the present invention is not limited to this. The image adhesion can be performed by acquiring proper information such as colors and patterns.

What is claimed is:

1. An image formation system comprising:

digital image data including at least one of a digital map or a photographed image;

a photographed area setting section for setting a first area in which an orthogonally projected image is to be formed on the digital image data;

an information setting section for setting photographing camera information relating to a camera which photographs an image from which the orthogonally projected image is to be formed;

a photographed area calculating section for obtaining a second area which can be photographed based on the photographing camera information which includes at least one of an angular field of a photograph lens, a size of a photograph plane, a focal length of the photograph lens or a photograph position related to the first area, and which is set by said information setting section;

a condition calculating section for calculating photographing conditions which include at least one of a photographing direction, a photographing angle or a photographing position in order to obtain a photograph image which can properly form the orthogonally projected image in the first area set by said photographed area setting section, based on the second area obtained by said photographed area calculating section, a navigation section for making an instruction for a present position where a surveyor currently exists and a place where the surveyor moves to prepare the orthogonally projected image, and a display section for displaying the photographed area, an instruction for a present position where the surveyor currently exists and a place where the surveyor moves to prepare the orthogonally projected image, and at least one of the calculated photographing conditions on the digital image data.

2. The image formation system according to claim 1, said image formation system further comprising:
an orthogonally projected image formation section for forming the orthogonally projected image from the photograph image photographed by the camera,
wherein said photographed area setting section further sets a third area in which a new orthogonally projected image is to be formed based on a new image, in the orthogonally projected image formed by said orthogonally projected image formation section,
said photographed area calculating section obtains a fourth area which can be newly photographed, based on the photographing camera information set to said information setting section, and
said condition calculating section calculates the photographing conditions to obtain the photograph image from which the orthogonally projected image can be properly formed, in the third area set by said photographed area setting section, based on the fourth area obtained by said photographed area calculating section.

3. The image formation system according to claim 1, said image formation system further comprising:
a navigation section including a GPS,
wherein position information is displayed.

4. The image formation system according to claim 1, wherein said camera is a camera for photographing a still picture, and the photographing conditions calculated by said condition calculating section include at least one of the total number of pictures taken inside the first area, a photographing direction, a photographing angle or a photographing position.

5. The image formation system according to claim 1, wherein said camera is a camera for photographing a moving picture, and the photographing conditions calculated by said condition calculating section include at least one of a photographing direction, a photographing angle, a movement direction, a movement speed or a photographing position.

6. The image formation system according to claim 1, wherein said condition calculating section calculates photographing conditions including a flight altitude in the case of aerial photographing, or calculates photographing conditions including a photographing angle and an angular field in the case of a land photographing.

7. The image formation system according to claim 1, wherein at least one of information of either the camera for photographing a still picture or the camera for photographing a moving picture, information of either the aerial photographing or the land photographing, or information of a required precision is set to said information setting section.

8. An image formation system comprising:
a processor; and
a memory coupled to the process, the memory comprising a plurality of instructions executed by the processor, the plurality of instructions configured to:
set a first area in which an orthogonally projected image is to be formed on digital image data, the digital image data including at least one of a digital map or a photographed image;
set photographing camera information for a predetermined camera that will photograph an image for forming the orthogonally projected image;
obtain a second area which can be photographed based on the photographing camera information which includes at least one of an angular field of a photograph lens, a size of a photograph plane, a focal length of the photograph lens or a photograph position related to the first area;
calculate photographing conditions that include at least one of a photographing direction, a photographing angle or a photographing position in order to obtain a photograph image to form the orthogonally projected image in the first area based on the second area,
provide an instruction to move from a present surveyor position to a second surveyor position where the orthogonally projected image is to be prepared; and
display the photographed area, information regarding a present surveyor position and a second surveyor position, and at least one of the calculated photographing conditions on the digital image data.

* * * * *